United States Patent
Cheon et al.

(10) Patent No.: US 12,025,970 B2
(45) Date of Patent: Jul. 2, 2024

(54) SAMPLING BASED OPTIMAL TREE PLANNING METHOD AND RECORDING MEDIUM STORING PROGRAM FOR EXECUTING THE SAME, AND COMPUTER PROGRAM STORED IN RECORDING MEDIUM FOR EXECUTING THE SAME

(71) Applicant: TWINNY CO., LTD., Daejeon (KR)

(72) Inventors: Hong Seok Cheon, Daejeon (KR); Tae Hyoung Kim, Daejeon (KR); Han Min Jo, Daejeon (KR); Jai Hoon Lee, Daejeon (KR)

(73) Assignee: TWINNY CO., LTD., Daejeon (KR)

(*) Notice: Subject to any disclaimer, the term of this patent is extended or adjusted under 35 U.S.C. 154(b) by 410 days.

(21) Appl. No.: 17/604,216

(22) PCT Filed: Feb. 27, 2020

(86) PCT No.: PCT/KR2020/002787
§ 371 (c)(1),
(2) Date: Oct. 15, 2021

(87) PCT Pub. No.: WO2020/213829
PCT Pub. Date: Oct. 22, 2020

(65) Prior Publication Data
US 2022/0206468 A1    Jun. 30, 2022

(30) Foreign Application Priority Data
Apr. 17, 2019 (KR) .......................... 10-2019-0044775

(51) Int. Cl.
*G05B 19/4155* (2006.01)
*G05D 1/00* (2024.01)

(52) U.S. Cl.
CPC ....... *G05B 19/4155* (2013.01); *G05D 1/0212* (2013.01); *G05B 2219/50391* (2013.01); *G05B 2219/50393* (2013.01)

(58) Field of Classification Search
CPC ...... G05B 19/4155; G05B 2219/50391; G05B 2219/50393; G05D 1/0212
(Continued)

(56) References Cited

U.S. PATENT DOCUMENTS 10,078,712 B2 *  9/2018  Bacon ..................... G06F 30/20
11,530,921 B2 * 12/2022  Nimmagadda ...... G08G 5/0021
(Continued)

FOREIGN PATENT DOCUMENTS

JP    2012-164061 A    8/2012
JP    2013-206043 A   10/2013
(Continued)

OTHER PUBLICATIONS

E. W. Dijkstra, "A note on two problems in connecxion with graphs", Numerische Mathematik, vol. 1, No. 1, 269-271, 1959.
(Continued)

*Primary Examiner* — Yazan A Soofi
(74) *Attorney, Agent, or Firm* — LRK PATENT LAW FIRM

(57) ABSTRACT

The present invention relates to a sampling based optimal tree planning method, a recording medium storing a program for executing the same, and a computer program stored in the computer-readable recording medium for executing the same, more particularly to, a sampling based optimal tree planning method, a recording medium storing a program for executing the same, and a computer program stored in the computer-readable recording medium for executing the same for enabling real-time path planning by reducing the number of nodes that require calculation by excluding state
(Continued)

values corresponding to input values that a mobile robot cannot select from the calculation and sampling some state values of a set of state values feasible for the robot when planning a path in a tree structure.

9 Claims, 10 Drawing Sheets

(58) Field of Classification Search
USPC .......................................................... 701/25
See application file for complete search history.

(56) References Cited

U.S. PATENT DOCUMENTS

2016/0378117 A1* 12/2016 Szatmary ............. G06V 10/145
   382/153
2019/0051198 A1* 2/2019 Nimmagadda ...... G05D 1/0274

FOREIGN PATENT DOCUMENTS

| KR | 10-1339480 B1 | 12/2013 |
| KR | 10-1664575 B1 | 10/2016 |
| KR | 10-2017-0050166 A | 5/2017 |
| KR | 10-2017-0071712 A | 6/2017 |
| KR | 10-2049962 B1 | 11/2019 |

OTHER PUBLICATIONS

Peter E. Hart, "A Formal Basis for the Heuristic Determination of Minimum Cost Paths", vol. ssc-4, No. 2, 1968.

* cited by examiner

EXTRACTION OF KINEMATICS FEASIBILITY AND
COLLISION-FREE STATE VALUE

SAMPLING BASED OPTIMAL TREE PLANNING METHOD AND RECORDING MEDIUM STORING PROGRAM FOR EXECUTING THE SAME, AND COMPUTER PROGRAM STORED IN RECORDING MEDIUM FOR EXECUTING THE SAME

CROSS-REFERENCE TO RELATED APPLICATIONS

The present application is a U.S. National Phase entry from International Application No. PCT/KR2020/002787, filed on Feb. 27, 2020, which claims priority to Korean Patent Application No. 10-2019-0044775, filed on Apr. 17, 2019, the disclosure of which is incorporated by reference herein in their entirety.

TECHNICAL FIELD

The present invention relates to a sampling based optimal tree planning method, a recording medium storing a program for executing the same, and a computer program stored in the computer-readable recording medium for executing the same, more particularly to a sampling based optimal tree planning method, a recording medium storing a program for executing the same, and a computer program stored in the computer-readable recording medium for executing the same for enabling real-time path planning by reducing the number of nodes that require calculation by excluding state values corresponding to input values that a mobile robot cannot select from the calculation and sampling some state values of a set of state values feasible for the robot when planning a path in a tree structure.

BACKGROUND ART

An autonomous driving robot refers to a robot that finds an optimal path to a destination and goes to a destination using a wheel or a leg while looking around and detecting an obstacle by itself.

A path planning or obstacle avoidance is an important element technology in autonomous driving of the mobile robot. The mobile robot should generate a path to the destination and move, but reach the destination without colliding with a surrounding obstacle. A good path means a shortest path that minimizes a movement path to the destination, or a safe path that minimizes the possibility of collision with the surrounding obstacle.

In general, the safe path is more important for robot applications, but the most ideal path would be the shortest path as much as possible while being safe.

In general, as a method of securing the safe path, a method of determining a moving direction of the robot by finding a direction with the most empty space using an obstacle detection sensor (device, such as a laser and a ultrasonic wave, etc., that can measure the distance to a nearby obstacle) mounted on the robot and also considering a direction of destination has been mainly used. The weights of the direction towards the empty space and the direction towards the destination are determined experimentally. If a lot of weight is given to the empty space, the possibility of collision with the obstacle can be minimized, but a case where the robot has to go around a long path or, in extreme cases, the robot does not reach the destination occurs. In contrast, if a lot of weight is given to the destination, the safety decreases.

A basic driving ability that the autonomous driving robot should have is an intelligent navigation ability that can move to a desired goal point on an optimal path without collision, and for such intelligent navigation, a path planning technology and a position recognition element technology are required.

Here, the path planning technology can be divided into a global path planning technology and a local path planning technology.

First, the global path planning is to search for the optimal path from a starting point to a goal point using a given environment map, and the local path planning means generating an actual movement trajectory to avoid a dynamic obstacle recognized by a sensor.

In addition, the position recognition technology is a positioning technology that finds out the current position of the robot on the map during driving.

As an example of the prior art for the global path planning method as described above, representatively, there is "Dijkstra's Algorithm" as published, for example, in "A note on two problems in connection with graphs (EW Dijkstra, Numerische Mathematik, Volume 1, Number 1, 269-271, 1959)".

More specifically, the Dijkstra algorithm described above has been suggested as the first path plan and has been widely used in various fields until now, but it has a disadvantage of requiring a lot of computation time because it searches for all spaces.

In addition, as another example of the prior art for the global path planning method as described above, there is A* algorithm as published, for example, in "A Formal Basis for the Heuristic Determination of Minimum Cost Paths in Graphs A star (PETER E. HART, VOL. ssc-4, NO 2, 1968)".

More specifically, the A* algorithm is a complementary form of the Dijkstra algorithm, and can achieve a faster search time than the Dijkstra algorithm based on a depth search and a breadth search by adding an appropriate evaluation function.

The local path planning is a technology that a local trajectory planner plans a trajectory so that the robot can move so as not to cause occurrence of collisions by the non-environmental obstacle when following the path generated by the global path plan given to the robot based on the current state of the robot and local environmental information.

The local path planning is an essential technology for the mobile robot to move to the destination without colliding with the obstacle in a daily space where environmental changes inevitably occur, and unlike the global path planning, real-time performance is required.

As an example of the prior art for the local path planning method as described above, there is an incremental (gradual) planning method in which a path is sequentially planned by giving waypoints through which the robot should pass.

The conventional incremental (gradual) planning method induces the robot to move while generating the best trajectory that does not modify the globally planned path as much as possible by selecting an input that minimizes a fixed cost function without colliding with the obstacle at every time step in which the robot plans the trajectory. In this case, there is a problem in that it is isolated because a trajectory without collision with the obstacle cannot be generated due to a previously determined selection, a natural trajectory without collision with the obstacle cannot be generated, and a movement that requires a high load on the robot can be induced.

Korean Registered Patent NO. 10-1664575 discloses an obstacle avoidance system of a mobile robot and a method thereof.

PRIOR ART LITERATURE

Patent Literature (Patent Literature 1) Korean Registered Patent NO. 10-1664575 (registration date: 2016 Oct. 4)

DISCLOSURE OF THE INVENTION

Technical Problem

Therefore, the present invention has been devised to solve the problems as described above, and an object of the present invention is to provide a sampling based local path planning method for enabling real-time path planning by reducing the number of nodes that require calculation by excluding state values corresponding to input values that a mobile robot cannot select from the calculation and sampling some state values of a set of state values feasible for the robot when planning a path in a tree structure.

Objects of the embodiments of the present invention are not limited to the object described above, and other objects not described will be clearly understood by those of ordinary skill in the art to which the present invention belongs from the following description.

Technical Solution

A sampling based optimal tree planning method according to an embodiment of the present invention for achieving the object as described above, the sampling based optimal tree planning method being implemented in a form of a program executed by a computation processing means including a computer, includes a sampling step S10 of extracting, by the computation processing means, a child node which is a state value according to an input value sampled according to a predetermined method, from a region consisting of a set of feasible state values in a parent node that is a state value that a robot needs to calculate at a specific time step, a time during which a movement of the robot is controlled being divided into time steps according to a certain standard, and a state tree creation step S20 of calculating a cost for a state transition from the parent node to the child node in the sampling step S10, and is characterized in that a process from the sampling step S10 to the state tree creation step S20 is repeatedly performed from the current time point of the robot to N (natural number) time steps, and an optimal path is generated based on the cost for the state transition from the parent node to the child node.

In addition, it is characterized in that, in the sampling step S10, the input value is extracted so that an interval between corresponding child nodes becomes narrower in a feasible velocity region of the robot in linear velocity and angular velocity space or a feasible acceleration region of the robot in linear acceleration and angular acceleration space, as the linear velocity, angular velocity, linear acceleration, or angular acceleration is closer to 0.

In addition, it is characterized in that, in the sampling step S10, a node corresponding to a velocity value belonging to the feasible velocity range of the robot in the linear velocity and angular velocity space is extracted, a node corresponding to an acceleration value belonging to the feasible acceleration range of the robot in the linear acceleration and angular acceleration space, and then the velocity region and the acceleration region are unified into one space selected from the linear velocity and angular velocity space or the linear acceleration and angular acceleration space, and a node corresponding to a state value belonging to a region where the velocity region and the acceleration region overlapped is extracted as the child node.

In addition, it is characterized in that, in the sampling step S10, a node corresponding to an intersection point value of a boundary of the velocity region and a boundary of the acceleration region in the unified space is additionally extracted as the child node.

In addition, it is characterized in that, in the sampling step S10, the feasible velocity region of the robot in the linear velocity and angular velocity space or the feasible acceleration region of the robot in the linear acceleration and angular acceleration space are unified into one space selected from the linear velocity and angular velocity space or the linear acceleration and angular acceleration space, and a node corresponding to a state value belonging to an actually feasible region of the robot, which is a region where the velocity region and the acceleration region are overlapped.

In addition, it is characterized in that, in the state tree creation step S20, a cost for state transition is calculated only for child nodes that do not collide with an obstacle among the child nodes extracted in the sampling step S10.

In addition, the sampling based optimal tree planning method is characterized in that a path to a child node, which corresponds to a last time step and whose sum of a cost for the state transition from the current point of the robot to the child node which corresponds to the last time step and heuristics the state transition from the child node which corresponds to the last time step to a goal point is the minimum, is determined as an optimal path.

In addition, it is characterized in that, in the time step, a time interval is defined for each time step and the time interval for each time step is determined according to a predetermined rule.

In addition, according to an embodiment of the present invention, it is characterized in that a computer-readable recording medium storing a program for executing the sampling based optimal tree planning method is provided.

In addition, according to an embodiment of the present invention, it is characterized in that a program stored in the computer-readable recording medium for executing the sampling based optimal tree planning method is provided.

Advantageous Effects

According to the sampling based optimal tree planning method, the recording medium storing the program for executing the same, and the computer program stored in the recording medium for executing the same according to an embodiment of the present invention, there is an effect that enables real-time path planning by shortening the calculation time by reducing the number of nodes that require calculation by excluding state values corresponding to input values that a mobile robot cannot select from the calculation and sampling some state values of a set of the state values feasible for the robot when planning a path in a tree structure.

In addition, the mobile robot can generate a collision-free trajectory with the smallest sum of total costs according to the cost of a predefined motion without predicting a situation according to a combination of all input values until a fixed point in the future, and thus there is an effect of shortening the computation time.

In addition, unlike the prior art, since the cost can be considered for the entire trajectory up to a predetermined time point, there is an effect that an unnecessary trajectory that is isolated or unnatural due to a previous selection is not generated.

In addition, there is an effect that a smoother robot motion can be implemented, by extracting the input value so that an interval between corresponding child nodes becomes narrower in the feasible velocity region of the robot or the feasible acceleration region of the robot in linear acceleration and angular acceleration space, as the linear velocity, angular velocity, linear acceleration, or angular acceleration is closer to 0.

In addition, there is an effect that a smoother robot motion can be implemented, by calculating the cost for state transition for specific acceleration values within the feasible acceleration region of the robot first and then additionally extracting the input value so that the closer to the corresponding state value, for which a result of the calculation becomes the minimum, the interval between child nodes becomes narrower.

In addition, there is an effect that the computation time can be shortened by reducing the number of selectable child nodes, by extracting the child node corresponding to the input value belonging to the region corresponding to an intersection of the velocity region and the acceleration region in the unified space.

Also, there is an effect that the computation time can be further shortened, by calculating the cost for state transition only for the child nodes that do not collide with an obstacle.

In addition, there is an effect that it is possible to calculate an optimal path while reducing the amount of computation, by determining a path to a child node, whose sum of a cost for the state transition from the current point of the robot to the child node which corresponds to the last time step and heuristics the state transition from the child node which corresponds to the last time step to a goal point is the minimum, as the optimal path.

In addition, there is an effect that it is possible to predict the future farther than the number of time steps, by setting the time interval for each layer differently.

REFERENCE NUMERALS

Figure 1:
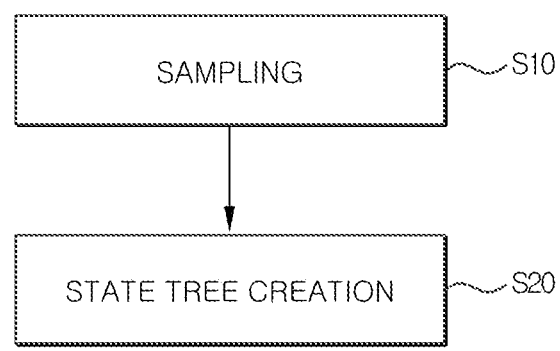
FIG. 1 is a flowchart of a sampling based optimal tree planning method according to an embodiment of the present invention.

10: Global Map
100: Global Path Planner
200: Local Path Planner
300: Local Environment Recognizer
310: Environment Recognition Sensor
400: Robot Movement Controller
S10: Sampling
S20: State Tree Creation

MODE FOR CARRYING OUT THE INVENTION

Since various changes can be made to the present invention and the present invention can have various embodiments, specific embodiments are illustrated in the drawings and described in detail. However, this is not intended to limit the present invention to specific embodiments, and should be understood to include all alterations, equivalents, and substituents included in the spirit and technical scope of the present invention.

When it is mentioned that a certain component is "coupled" or "connected" to another component, it should be understood that the component may be directly coupled to or connected to the other component, but other component may exist therebetween.

On the other hand, when it is mentioned that a certain element is "directly coupled" or "directly connected" to another element, it should be understood that no other element exists therebetween.

The terms used herein are used only to describe specific embodiments, and are not intended to limit the present invention. The singular expression includes the plural expression unless the context clearly dictates otherwise. In the present application, terms such as "include" or "have" are intended to designate the presence of a feature, number, process, action, constituent element, part, or combination thereof described in this specification, and should be understood that it does not preclude in advance the possibility of presence or addition of one or more other features, numbers, steps, actions, elements, parts or combinations thereof.

Unless otherwise defined, all terms used herein, including technical or scientific terms, have the same meaning as commonly understood by a person of ordinary skill in the art to which this invention belongs. Terms such as those defined in a commonly used dictionary should be interpreted as having a meaning consistent with the meaning in the context of the relevant art, and should not be interpreted in an ideal or excessively formal meaning unless explicitly defined in the present application.

Hereinafter, the present invention will be described in more detail with reference to the accompanying drawings. Prior to the description, the terms or words used in this specification and claims should not be construed as being limited to conventional or dictionary meanings, but should be interpreted as a meaning and concept consistent with the technical idea of the present invention based on the principle that the inventor can appropriately define the concept of a term in order to explain his or her invention in the best way. In addition, if there is no other definition in the technical and scientific terms used, the terms have meanings commonly understood by those of ordinary skill in the art to which this invention belongs, and in the following description and accompanying drawings, descriptions of well-known functions and configurations that may unnecessarily obscure the gist of the present invention will be omitted. The drawings introduced below are provided as examples in order to sufficiently convey the spirit of the present invention to those of ordinary skill in the art. Accordingly, the present invention is not limited to the drawings presented below and may be embodied in other forms. In addition, throughout the specification, the same components are denoted by the same reference numerals. It should be noted that the same components in the drawings are denoted by the same reference numerals wherever possible.

Figure 2:
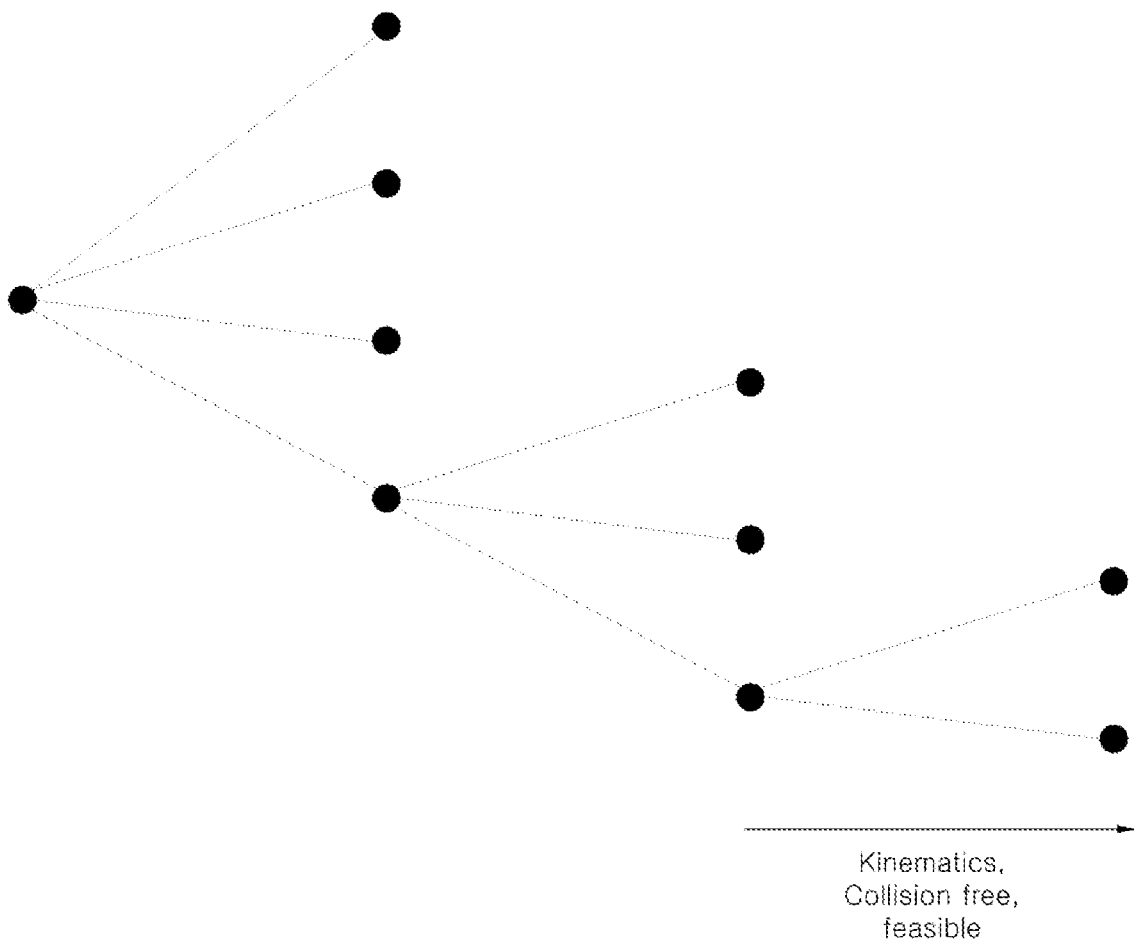
FIG. 2 is an exemplary diagram of a state tree of the sampling based optimal tree planning method according to an embodiment of the present invention.
Figure 3:
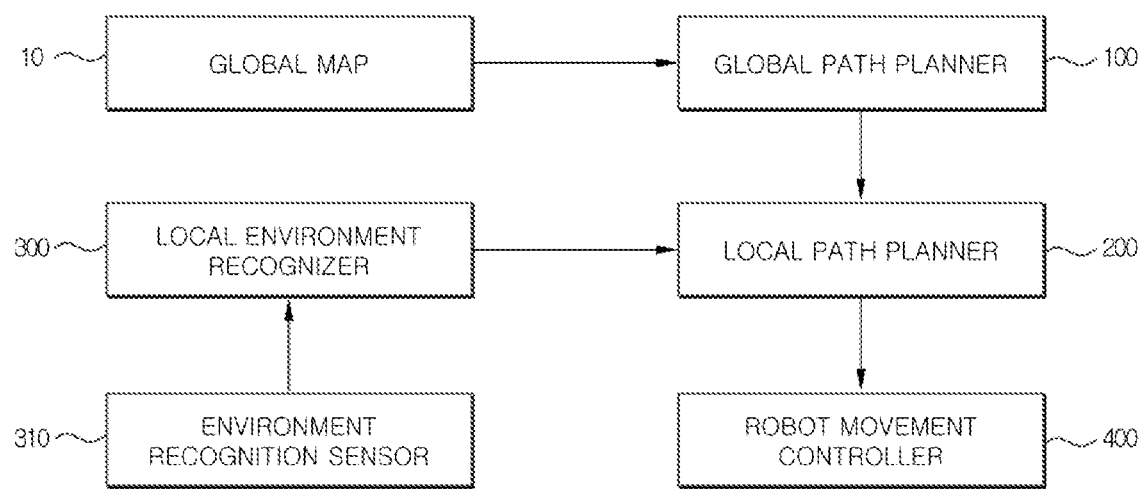
FIG. 3 is a block diagram of moving path planning of a robot to which the sampling based optimal tree planning method according to an embodiment of the present invention is applied.
Figure 4:
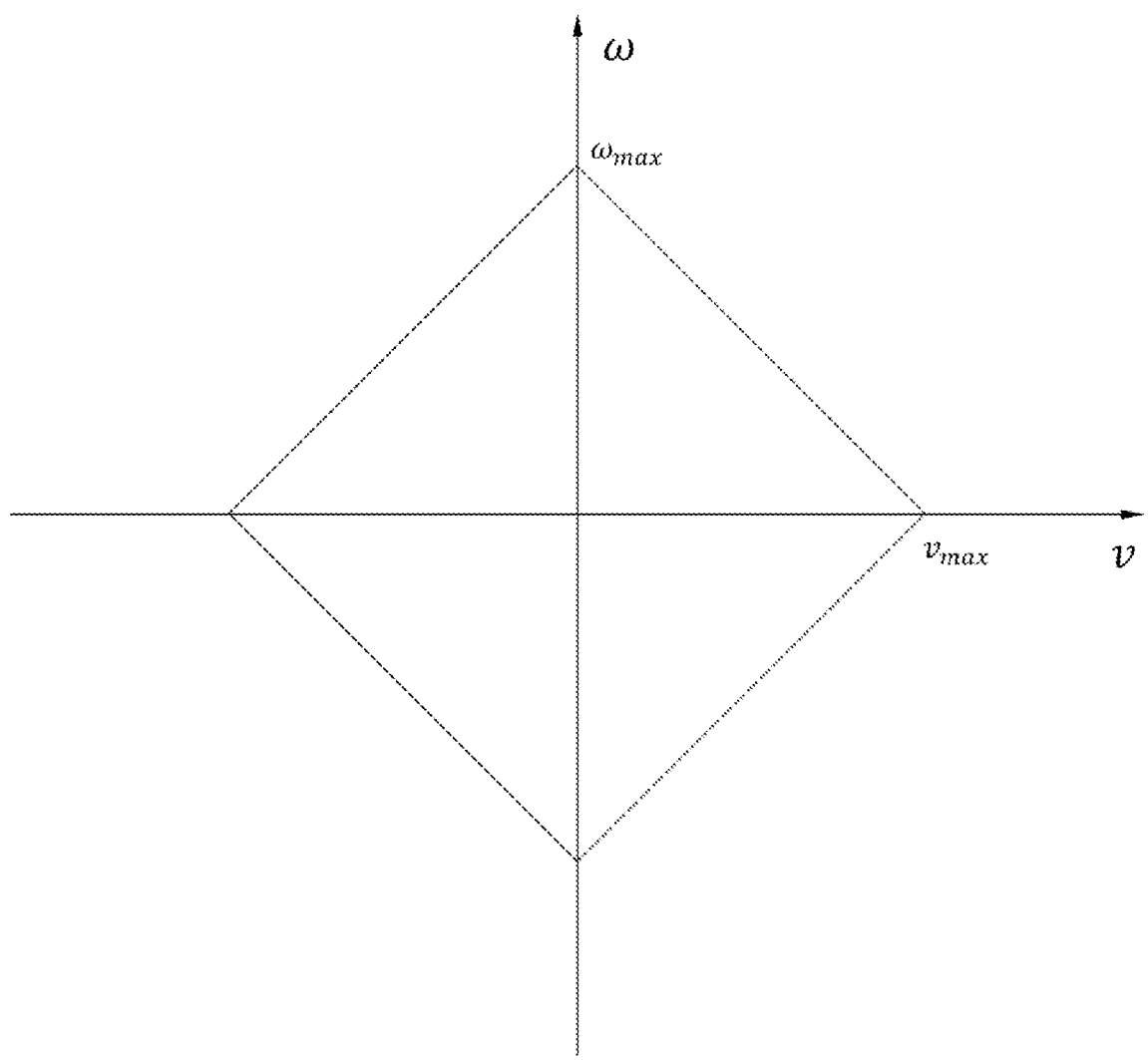
FIG. 4 is an exemplary diagram illustrating a feasible velocity range of the robot in linear velocity v and angular velocity w space in a form of a green rhombus.
Figure 5:
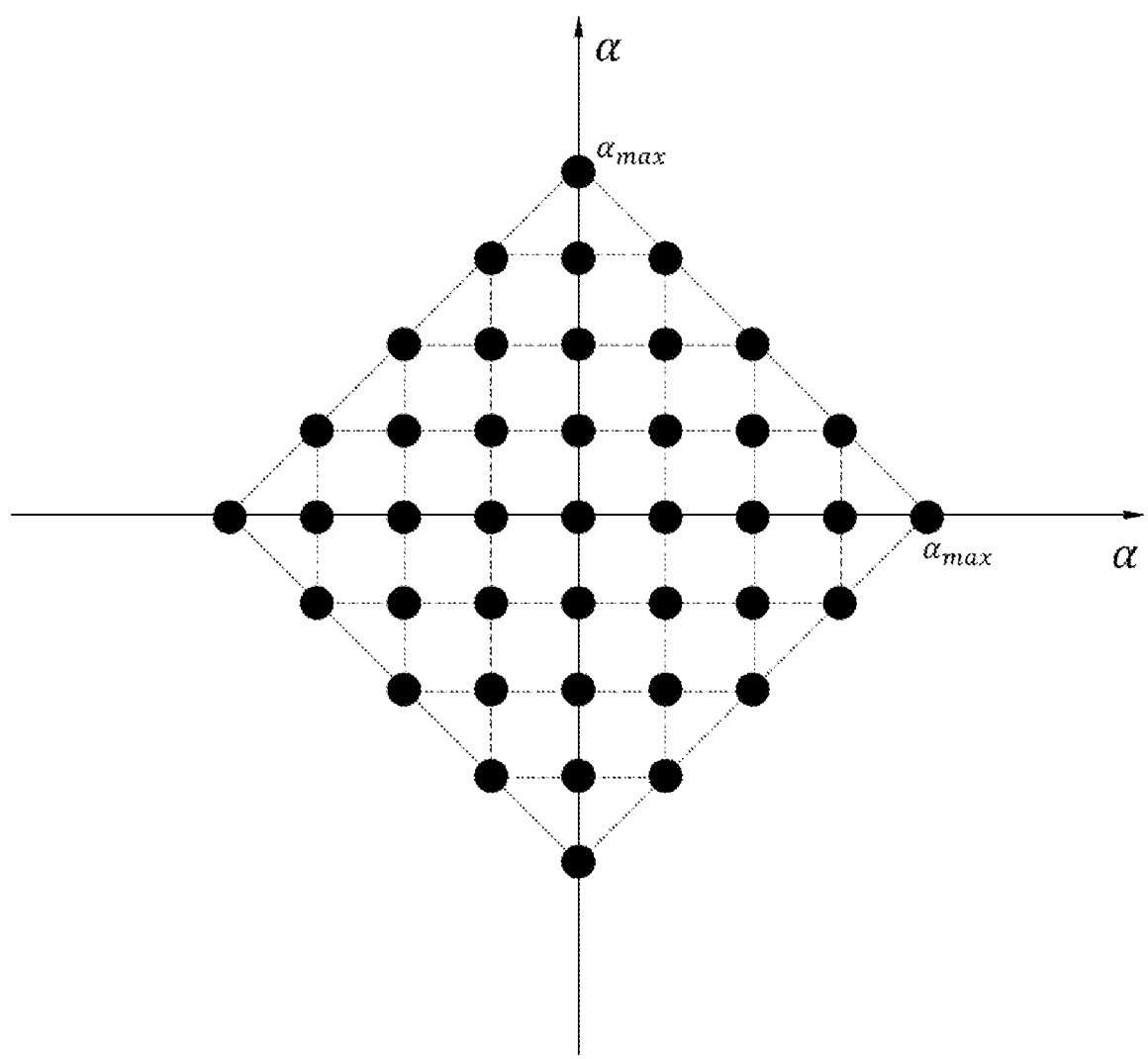
FIG. 5 is an exemplary diagram which illustrates a feasible acceleration region of the robot in linear acceleration $\alpha$ and angular acceleration $\alpha$ space in a form of a light blue rhombus, and in which the acceleration region is converted to a linear-scale, a feasible region is divided into equal intervals and sampled, and a set of finite points that fall within the region is represented as feasible acceleration values (yellow dots).
Figure 6:
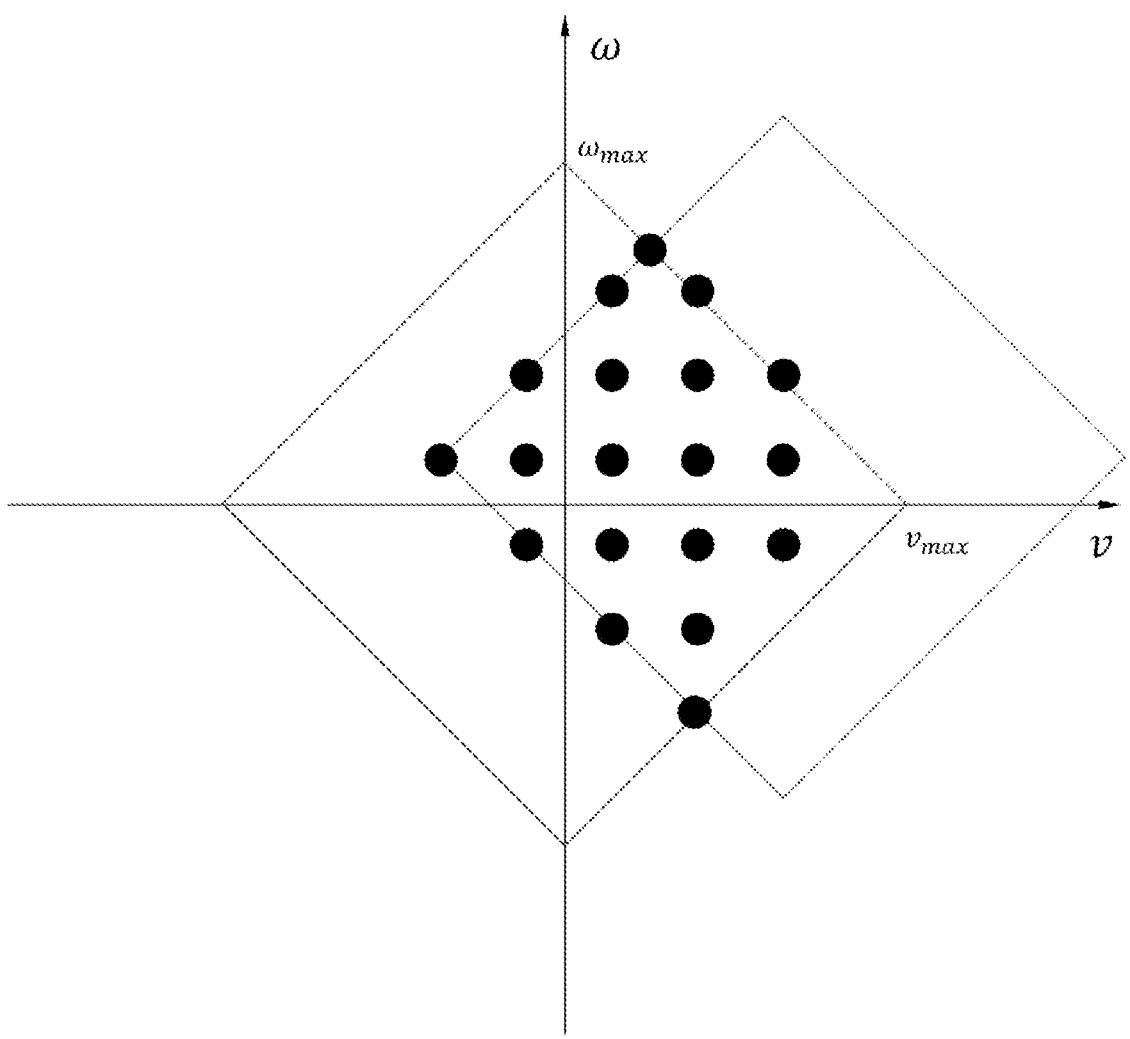
FIG. 6 is an exemplary diagram illustrating velocity values (the green dot is the velocity value extracted by sampling, and the red dot is the velocity value corresponding to the intersection point of the boundary between the velocity region and acceleration region) belonging to an intersection with a feasible acceleration region based on a current velocity value (yellow dot) belonging to the velocity region.
Figure 7:
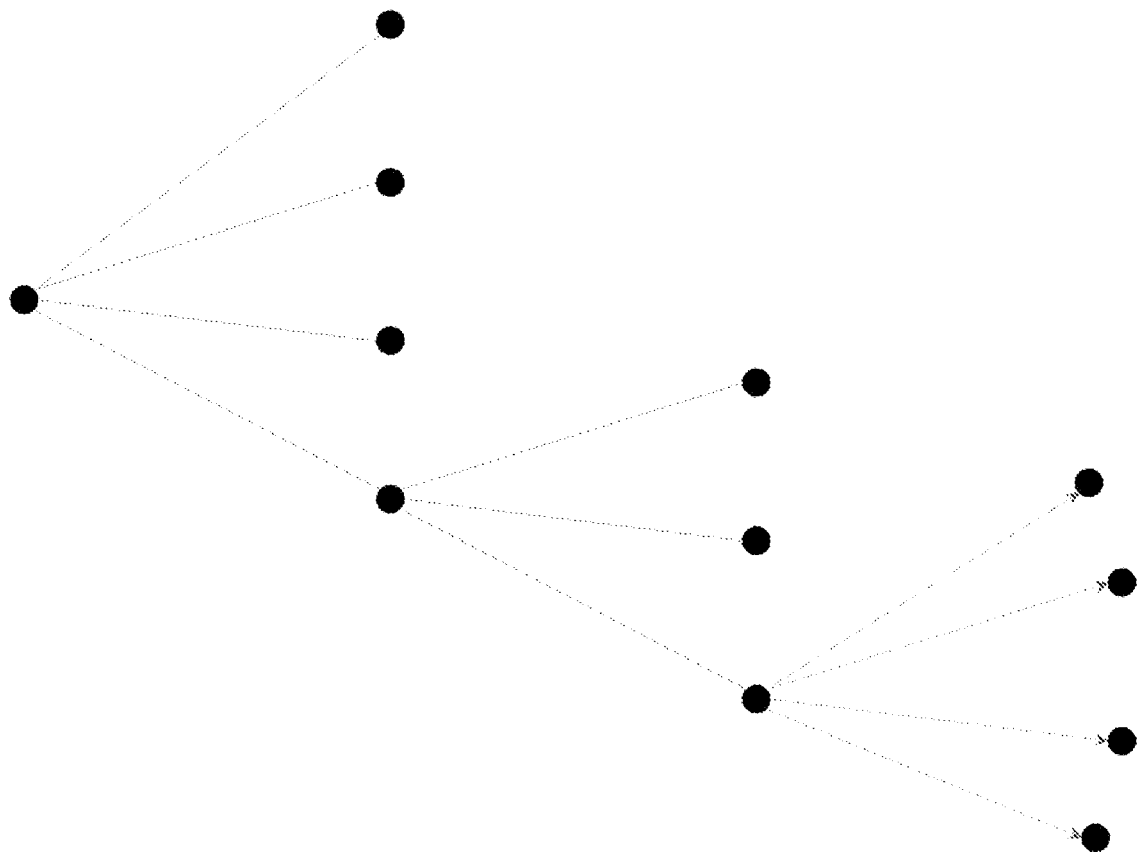
FIG. 7 is an exemplary diagram illustrating an example of selecting a feasible input value of the robot and selecting the corresponding node as a child node (yellow dot).
Figure 8:
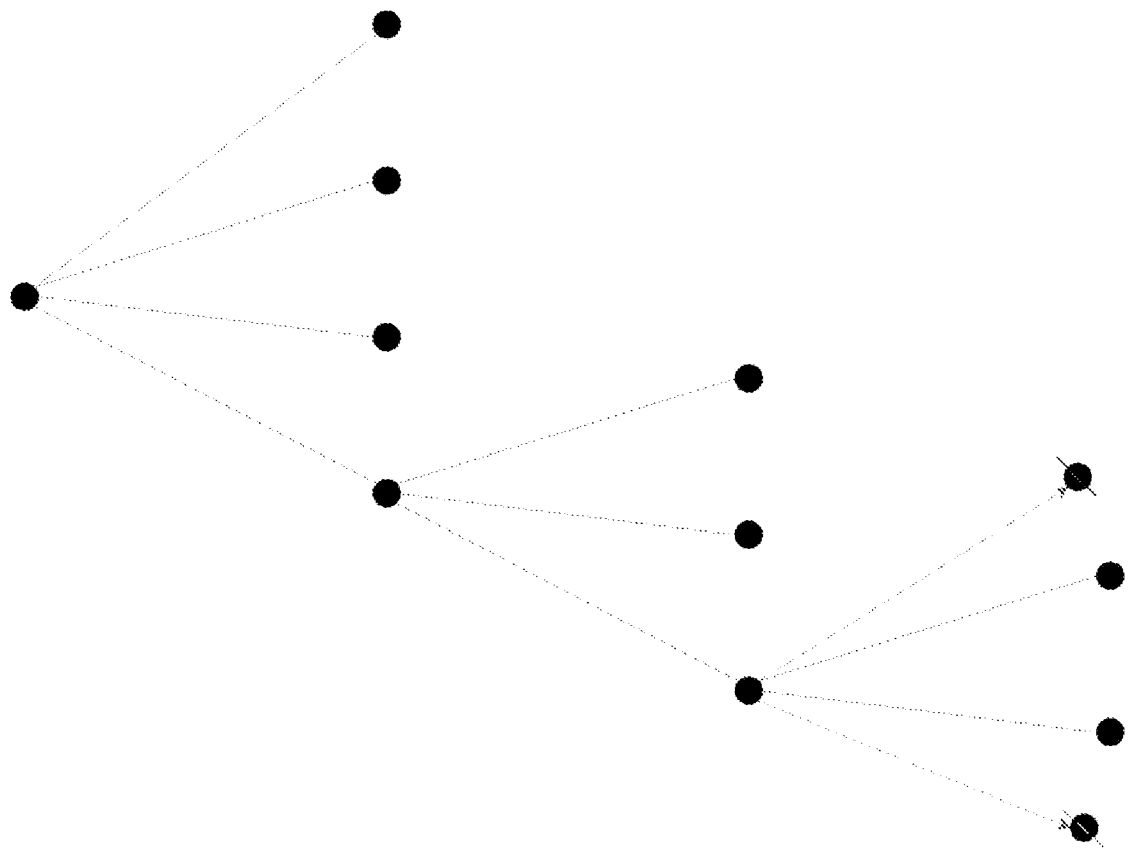
FIG. 8 is an exemplary diagram illustrating an example of excluding (red oblique line) colliding child nodes after checking collision with an obstacle in FIG. 7.
Figure 9:
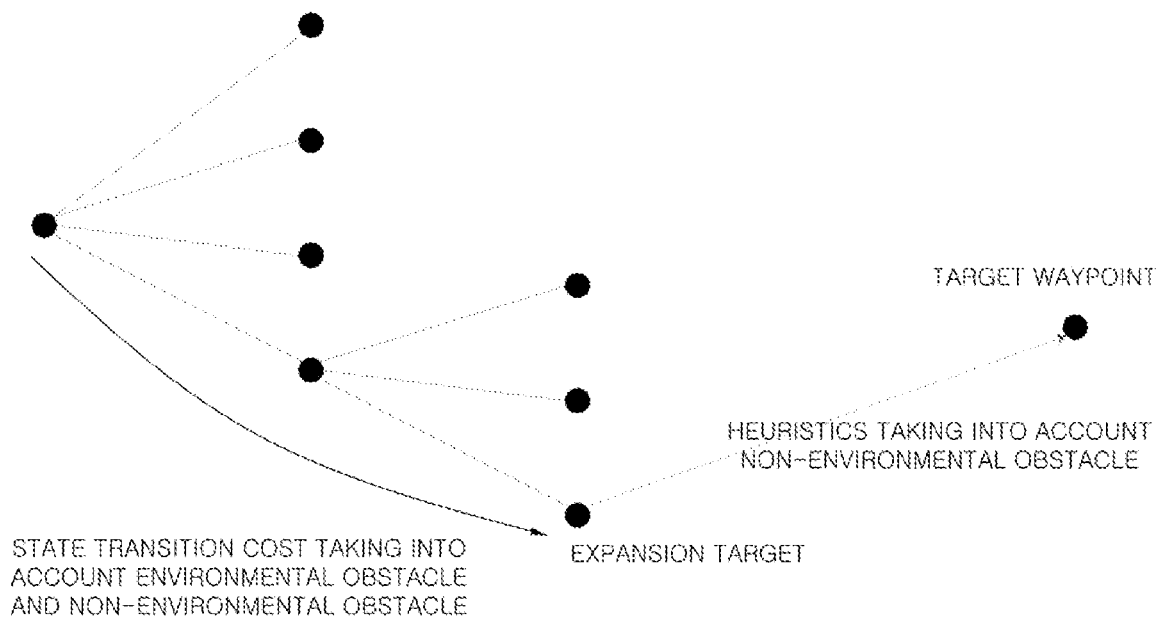
FIG. 9 is an exemplary diagram illustrating an example in which a leaf node in a state tree is determined as an expansion target node in setting an optimal path to a goal waypoint.
Figure 10:
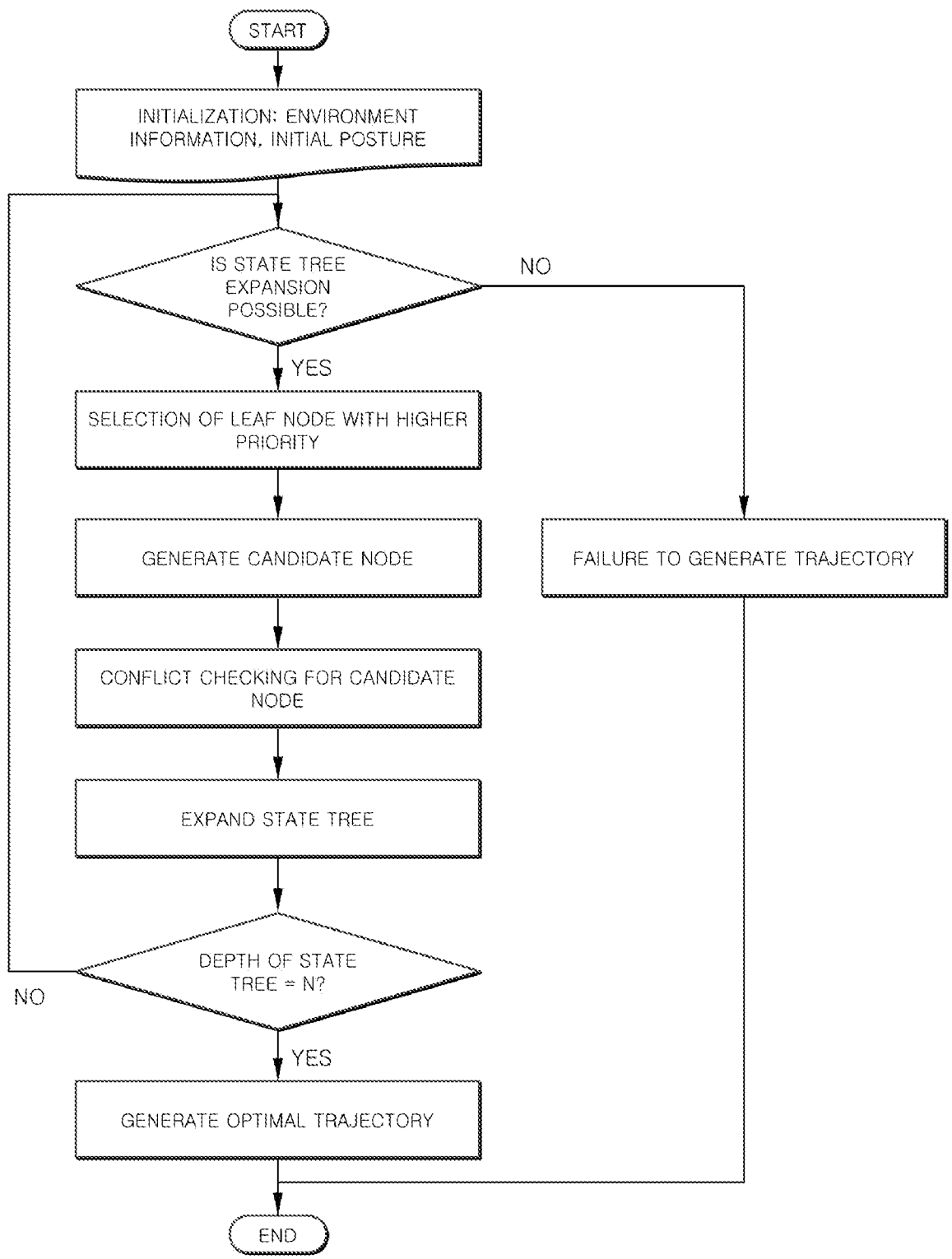
FIG. 10 is a flowchart illustrating an example of an algorithm to which the sampling based optimal tree planning method according to an embodiment of the present invention is applied.

FIG. 1 is a flowchart of a sampling based optimal tree planning method according to an embodiment of the present invention, FIG. 2 is an exemplary diagram of a state tree of the sampling based optimal tree planning method according to an embodiment of the present invention, FIG. 3 is a block diagram of moving path planning of a robot to which the sampling based optimal tree planning method according to an embodiment of the present invention is applied, FIG. 4 is an exemplary diagram illustrating a feasible velocity range of the robot in linear velocity v and angular velocity w space in a form of a green rhombus, FIG. 5 is an exemplary diagram which illustrates a feasible acceleration region of the robot in linear acceleration a and angular acceleration α space in a form of a light blue rhombus, and in which the acceleration region is converted to a linear-scale, a feasible region is divided into equal intervals and sampled, and a set of finite points that fall within the region is represented as feasible acceleration values (yellow dots), FIG. 6 is an exemplary diagram illustrating velocity values (the green dot is the velocity value extracted by sampling, and the red dot is the velocity value corresponding to the intersection point of the boundary between the velocity region and acceleration region) belonging to an intersection with a feasible acceleration region based on a current velocity value (yellow dot) belonging to the velocity region, FIG. 7 is an exemplary diagram illustrating an example of selecting a feasible input value of the robot and selecting the corresponding node as a child node (yellow dot), FIG. 8 is an exemplary diagram illustrating an example of excluding (red oblique line) colliding child nodes after c checking collision with an obstacle in FIG. 7, FIG. 9 is an exemplary diagram illustrating an example in which a leaf node in a state tree is determined as an expansion target node in setting an optimal path to a goal waypoint, and FIG. 10 is a flowchart illustrating an example of an algorithm to which the sampling based optimal tree planning method according to an embodiment of the present invention is applied.

Prior to description, terms used in this specification (and claims) will be briefly described.

A state value of the robot may include any one or a plurality of information selected from a posture, velocity, and time point of the robot.

The posture of the robot may include coordinate data indicating a position and information on a bow angle.

A 'node' means the state value that the robot can take in a state tree.

A line connecting the nodes to each other is called an 'edge' and means the cost for state transition of the robot. That is, the higher this value, the higher the cost for the robot required to convert from the current state to that state.

A set represented by nodes and edges is called a 'state tree'.

A root node of the state tree means a state of the robot at the current location.

That is, the state tree means that state values that the robot can have at a given time point are represented in a tree structure.

The state tree can be expanded from a parent node to a child node, which means that the robot transitions from one (parent node) state to another (child node) state.

In the state tree, a 'parent node' can have several 'child nodes', and an expanded child node, as one parent node, can have several other child nodes.

In the state tree, a candidate node means an arbitrary node that can be derived from the parent node, and may be determined as the child node when a specific condition is satisfied.

Therefore, a level exists in the state tree, a time interval is defined between layers, and this time interval is called a 'time step'.

When expanding from the root node to N time steps using the sampling based optimal tree planning method according to an embodiment of the present invention, the node of the last time step is called a 'leaf node', and the 'leaf node' is configured in a state that the robot can have.

The leaf node has a final cost value, which is the sum of all cost values from the root node to the leaf node, and a heuristic value up to a waypoint designated as a current goal.

The heuristic value described above is an estimated value of a cost value that can be generated in going from the corresponding node to the goal point, and may be obtained through a given global map except for a non-environmental obstacle not represented on the map.

Although basic variables and terms are arranged, not all variables and terms necessary for description are arranged, and newly appearing variables and terms other than the variables and terms defined above will be described later.

If there is a mobile robot, the characteristics of the motor or the current and voltage input to the motor can be used for computation in order to consider the dynamism, but since the amount of computation increases and the real-time performance decreases, description will be made below based on the angular velocity and angular acceleration of the wheel.

However, it should be noted that the present invention is not limited to computation based on the angular velocity and angular acceleration of the wheel.

An option of input values for movement (state (position, bearing, velocity, etc.) space) that the mobile robot can select is limited. In this case, representative values corresponding to the input values are the acceleration of the mobile robot, the velocity of the mobile robot, the angular acceleration of the wheel of the mobile robot, the angular velocity of the wheel of the mobile robot, etc.

That is, there is a limitation on the state value that the mobile robot can take next according to the characteristics of kinematics of the mobile robot in the current state of the mobile robot.

In other words, the mobile robot has limitations due to restriction in velocity, acceleration, etc. such as rapid acceleration, rapid deceleration, maximum velocity, etc.

An input value that the mobile robot can select implies that a state value of the mobile robot transitioned due to the input value becomes a feasible state value that does not deviate from the kinematics limiting conditions.

In this case, it is possible to reduce the time required for calculation by selecting input values that are outside the limiting conditions, that the mobile robot cannot select, in advance and excluding them from the calculation, and further reduce the time required for calculation by selecting and calculating a certain number of samples from among the input values that the mobile robot can select.

To this end, the sampling based optimal tree planning method according to an embodiment of the present invention is used to generate an optimal path by extracting a certain number of samples from among the input values that the mobile robot can select.

As illustrated in FIG. 1, the sampling based optimal tree planning method according to an embodiment of the present invention, the sampling based optimal tree planning method being implemented in the form of a program executed by a computation processing means including a computer, includes a sampling step S10 and a state tree creation step S20, and is characterized in that a process from the sampling step S10 to the state tree creation step S20 is repeatedly performed from the current time point of the robot to N (natural number) time steps, and an optimal path is generated based on the cost for the state transition from the parent node to the child node.

In the sampling step S10, the time during which a movement of the robot is controlled is divided into time steps according to a certain standard, and the computation processing means extracts a child node, which is a state value according to an input value sampled according to a predetermined method, from a region consisting of a set of feasible (selectable) state values (set considering input values for movement) in a parent node that is a state value that the robot needs to calculate at a specific time step (at present or in the future).

This is not to compute all state values, but to reduce the time required for calculation and enable real-time computation by excluding state values corresponding to input values that the mobile robot cannot select (primary reduction of computation amount) and extracting and computing some state values among them (secondary reduction of computation amount).

In the state tree creation step (S20), a cost for the state transition from the parent node to the child node in the sampling step S10 is calculated.

That is, the sampling based optimal tree planning method according to an embodiment of the present invention including the sampling step S10 and the state tree creation step S20 can create a state tree of the robot (see FIG. 2) by determining some of elements included in the set of feasible states as nodes in consideration of the feasible input values (velocity, acceleration, etc.) of the robot among the state values of the robot.

The movement of the robot to which the sampling based optimal tree planning method according to an embodiment of the present invention is applied can be described with reference to FIG. 3.

The robot receives a task for moving to the goal point with a pre-written or pre-input global map 10 from the user.

In the global map 10, environmental obstacles that are limited in movement with respect to time are mainly marked, and a global path planner 100 plans a global path and transmits it to a local path planner 200.

The global path is represented by connecting a plurality of waypoints from the starting point to the final goal point.

Before moving, the robot recognizes a dynamic or static obstacle in the vicinity recognized by an environment recognition sensor 310 in a local environment recognizer 300 and transmits environmental information about the surroundings to the local path planner 200.

Environment information acquired by the environment recognition sensor 310 includes obstacle data that can be considered as an obstacle, that is, a path that the robot cannot pass, and coordinate data on a path that the robot can pass. In addition, the environment information may have position information expected according to time with respect to the dynamic obstacle.

Data on the obstacle and the path can be roughly divided into two types, and may include any data type. That is, it may include information such as grid-type data or various shapes (plane, line segment, circle, arc, etc.) or color of an object.

The local path planner 200 plans a trajectory for reaching the waypoints sequentially without collision with obstacles in order to reach the final goal point, using the sampling based optimal tree planning method according to an embodiment of the present invention.

That is, the state tree of the robot can be expanded from the current time point to N time steps.

The fact that the state tree of the robot cannot be expanded means that there is no node that can be determined as the next node from the current node, and it can be interpreted that the robot is in a state where it cannot but collide no matter which direction it moves in N time steps.

Therefore, the algorithm can be terminated in this case.

A robot movement controller 400 moves the robot according to the locally planned trajectory.

The process described above may be repeated at a constant period until the robot reaches the goal point.

The sampling based optimal tree planning method according to an embodiment of the present invention may presuppose the following assumptions.

The computational processing means for planning the path of the robot can store or fetch and utilize a global map on which environmental obstacles are represented, and the robot knows the waypoints to go through in moving to the goal point through the global plan.

The local non-environmental obstacle can be detected by the environmental recognition sensor 310 mounted on the robot.

The sampling based optimal tree planning method according to an embodiment of the present invention can generate a collision-free trajectory with respect to an input of piecewise-constant acceleration for each time step separately for up to N time steps, based on the current state of the robot and the local environment information detected by the sensor mounted on the robot.

Here, generating a trajectory for the input of piecewise-constant acceleration for each time step is to reduce the amount of computation.

That is, when it is determined that the amount of computation is sufficient for real-time computation, it goes without saying that an input other than a constant acceleration input can be used.

The sampling based optimal tree planning method according to an embodiment of the present invention is to naturally avoid obstacles in state-time space in consideration of environmental information (stationary and moving obstacle information), kinematics limitations of the robot, and performance limitations of the robot.

The 'state-time space' refers to a set of state values considered for time.

The sampling based optimal tree planning method according to an embodiment of the present invention can generate an optimal movement trajectory using a state tree expanded to a specific finite horizon.

It may be characterized in that, in the sampling step (S10) of the sampling based optimal tree planning method according to an embodiment of the present invention, the input value is extracted so that an interval between corresponding child nodes becomes narrower in a feasible velocity region of the robot in linear velocity and angular velocity space or a feasible acceleration region of the robot in linear acceleration and angular acceleration space, as the linear velocity, angular velocity, linear acceleration, or angular acceleration is closer to 0.

When the linear velocity and angular velocity space is represented in a coordinate plane space, the linear velocity may be represented by the x-axis and the angular velocity by the y-axis (see FIG. 4).

When the linear acceleration and angular acceleration space is represented in a coordinate plane space, the linear acceleration may be represented by the x-axis and the angular acceleration by the y-axis (see FIG. 5).

When the linear acceleration and angular acceleration space is described as an example, the input value can be extracted so that the interval between the corresponding child nodes becomes narrower as the feasible linear acceleration of the robot in the linear and angular acceleration space is closer to 0. This is to prevent the linear acceleration from changing rapidly to thereby reduce the physical load acting on the robot and enable smoother movement.

As another example, the input value can be extracted so that the distance between the corresponding child nodes becomes narrower as the feasible angular acceleration of the robot in the linear acceleration and angular acceleration space is closer to 0. This is also to prevent the angular acceleration from changing rapidly to thereby reduce a yaw movement as if the robot oscillates from side to side and enable smoother movement.

As still another example, it is possible to mix and use the two examples described above. This can prevent both the linear acceleration and the angular acceleration from changing rapidly to thereby enable smooth movement of the robot.

In the above description, although extracting the input value so that the interval between the corresponding child nodes becomes narrower as the linear velocity or angular acceleration is closer to 0 is described as an example, the present invention is not limited thereto. The child node can be selected through a predefined method in various ways in the region consisting of the set of feasible state values.

It goes without saying that, for example, various implementations are possible, such as implementation which is characterized by converting the feasible velocity region of the robot in linear velocity and angular velocity space or the feasible acceleration region of the robot in linear acceleration and angular acceleration space to a linear-scale, dividing and sampling a feasible region at equal intervals, and extracting a set of finite points that fall into the region as the feasible input values or implementation which is characterized by converting the feasible velocity region of the robot in linear velocity and angular velocity space or the feasible acceleration region of the robot in linear acceleration and angular acceleration space to a log-scale, exponential-scale, or quadratic-scale scale, dividing and sampling a feasible region at equal intervals, and extracting a set of finite points that fall within the region as the feasible input values.

When described in more detail under the assumption that a differential drive mobile robot is used and angular acceleration values of both wheels are used as input values, if a feasible angular acceleration value of an n-th left wheel of the differential drive mobile robot is $w_{l,n}$, an angular acceleration value of an m-th right wheel is $w_{r,m}$, and A is a set of combinations ($w_{l,n}$, $w_{r,m}$) of all feasible angular acceleration values, A can be represented as follows.

$$A = \{(w_{l,n}, w_{r,m}) | w_{l,n} \in R, n=1,2,\ldots,N \text{ and } m=1,2,\ldots,M\}$$

Here, N and M are the number of feasible angular acceleration values of the left and right wheels, respectively, and R denotes a set of real numbers. The following method may be used as a method for determining the acceleration set A.

The method of converting the feasible acceleration region of the robot to the linear-scale, dividing and sampling the feasible region at equal intervals, and extracting a set of finite points that fall within the region as the input values can be represented as the following equation.

$$w_{l,n} = \frac{2n - N - 1}{N - 1} w_{l,max}, \quad w_{r,m} = \frac{2m - N - 1}{N - 1} w_{r,max}$$

The method of converting the feasible acceleration region of the robot to the log-scale, exponential-scale, or quadratic-scale scale, dividing and sampling a feasible region at equal intervals, and extracting a set of finite points that fall within the region as the feasible input values can be represented as the following equation.

$$w_{l,n} \in \{-w_{l,max}, \ldots, -e^{2-(N-1)/2} w_{l,max}, -e^{1-(N-1)/2} w_{l,max}, 0, e^{1-(N-1)/2} w_{l,max}, e^{2-(N-1)/2} w_{l,max}, \ldots, w_{l,max}\}$$

$$w_{r,m} \in \{-w_{r,max}, \ldots, -e^{2-(N-1)/2} w_{r,max}, -e^{1-(N-1)/2} w_{r,max}, 0, e^{1-(N-1)/2} w_{r,max}, e^{2-(N-1)/2} w_{r,max}, \ldots, w_{r,max}\}$$

In addition to this, various methods can be used, such as a method of arbitrarily converting the acceleration space, dividing and sampling a feasible region at equal intervals or intervals according to a set rule, and determining the input values with a set of finite points that fall within the region.

All feasible linear accelerations α and angular accelerations α of the differential drive mobile robot can be obtained as follows, using the set of feasible accelerations of the differential drive mobile robot.

$$a = 0.5 \, w_{r,m} + 0.5 \, w_{l,n}, \quad \alpha = \frac{w_{r,m} - w_{l,n}}{D}$$

Here, D denotes the distance between both wheels of the differential drive mobile robot.

It may be characterized in that, in the sampling step S10 of the sampling based optimal tree planning method according to an embodiment of the present invention, the cost for the state transition of a state value corresponding to a specific point (edge, etc.) according to a predetermined rule in the feasible velocity range of the robot in the linear velocity and angular velocity space or the feasible acceleration range of the robot in the linear acceleration and angular acceleration space is calculated first and then the input value is extracted so that the closer to the corresponding state value, for which a result of the calculation becomes the minimum, the interval between child nodes becomes narrower.

For example, in the case of FIG. 4, there may be a case where, in the velocity space corresponding to the rhombus, the state value corresponding to the point at which the linear velocity is the maximum, the point where the linear velocity is the minimum, the point where the angular velocity is the maximum, or the point where the angular velocity is the minimum has a higher probability of transition than other points.

Therefore, before extracting a full-fledged child node, after calculating the cost of state transition for points has a high probability of transition than other points first, the input value can be additionally extracted so that the closer to the corresponding state value, for which a result of the calculation becomes the minimum, the interval between child nodes becomes narrower.

It is characterized in that, in the sampling step S10 of the sampling based optimal tree planning method according to an embodiment of the present invention, a velocity value belonging to the feasible velocity range of the robot in the linear velocity and angular velocity space is extracted, an acceleration value belonging to the feasible acceleration range of the robot in the linear acceleration and angular acceleration space is extracted, then the velocity region and the acceleration region are unified into one space selected from the linear velocity and angular velocity space or the linear acceleration and angular acceleration space, and a node corresponding to a state value belonging to a region where the velocity region and the acceleration region overlapped is extracted as the child node.

That is, after extracting the nodes corresponding to the feasible velocity values in the velocity region and extracting the nodes corresponding to the feasible acceleration values in the acceleration region, the nodes corresponding to the state values belonging to the intersection of the two regions can be finally extracted as child nodes by converting a given value in any one of the regions to another space.

In the above description, although extracting a node from each region and extracting a node corresponding to the intersection of two regions as a child node is described as an example, the present invention is not limited thereto. It goes without saying that it is also possible to extract a node from either the velocity region or the acceleration region and to extract the node corresponding to the intersection of the two regions as a child node (see FIG. 6).

As illustrated in FIG. 6, it may be characterized in that, in the sampling step S10 of sampling based optimal tree planning method according to an embodiment of the present invention, the value of the intersection point of the boundary of the velocity region and the boundary of the acceleration region in the unified space is additionally extracted as a child node.

There may be a case where the intersection point of the boundary of the velocity region and the boundary of the acceleration region in the unified space has a higher probability of transition than other points. Therefore, if this point was not extracted as a child node, it is desirable to extract this point as the child node as well.

In the above description, although performing the node extraction first, and then extracting the nodes for the intersection of the velocity region and the acceleration region in the unified space as child nodes is described as an example, the present invention is not limited thereto. It goes without saying that various implementations such as the following implementation are possible.

It may be characterized in that, in the sampling step S10 of sampling based optimal tree planning method according to an embodiment of the present invention, the feasible velocity region of the robot in the linear velocity and angular velocity space and the feasible acceleration region of the robot in the linear acceleration and angular acceleration space are unified into one space selected from among the linear velocity and angular velocity space and the linear acceleration and angular acceleration space, and a child node is extracted from a region of actually feasible state values of the robot, which is a region where the velocity region and the acceleration region are overlapped.

That is, it is possible to find the intersection of the state values belonging to the velocity region and the acceleration region in the unified space first and to extract child nodes among them.

In this case, in FIG. 4, etc., although extracting child nodes by dividing it into the x-axis and y-axis is described as an example, the present invention is not limited thereto. It goes without saying that the intersection of the velocity region and the acceleration region in a unified space is usually in the form of a parallelogram, and thus various implementations are possible, such as extracting child nodes by dividing it so as to be parallel to the intersection boundary of the velocity region and the acceleration region.

It may be characterized in that, in the state tree creation step S20 of the sampling based optimal tree planning method according to an embodiment of the present invention, the cost for the state transition is calculated only for the child nodes that do not collide with an obstacle among the child nodes (see FIG. 7) extracted in the sampling step S10.

In this case, the child nodes extracted in the sampling step S10 can be called candidate nodes, only the candidate nodes that do not collide with the obstacle among them can be determined as child nodes and the cost for the state transition thereof can be calculated.

That is, the cost for state transition may be calculated by extracting child nodes capable of avoiding collisions with non-environmental obstacles detected by the environmental recognition sensor 310 of the robot.

In other words, all the child nodes generated with the input value extracted in the sampling step S10 are not computed, and the time used for the cost for the state transition can be reduced by calculating the cost for the state transition only for the child nodes that do not collide with non-environmental or environmental obstacles among the candidate nodes.

In this case, in the state tree creation step S20, the child node (candidate nodes) that collides may be deleted after checking the collision for each child node (candidate node) (see FIG. 8).

The child nodes remained thereafter can be composed of a feasible set of robot's states in an obstacle-free space, and the state tree can be expanded using the remaining child nodes.

In this case, the sum of costs to the expanded child nodes can be calculated, respectively, and the sum of costs to the specific node may mean a sum of cost values (total sum of values corresponding to edges on the state tree) due to a state change from the current node to the specific node.

The sampling based optimal tree planning method according to an embodiment of the present invention may be characterized in that a path to a child node (leaf node), which corresponds to the last time step and whose sum of a cost for the state transition from the current point (root node) of the robot to the child node (leaf node) which corresponds to the last time step and heuristics the state transition from the child node (leaf node) which corresponds to the last time step to a goal point is the minimum, is determined as an optimal path.

That is, a local path can be found using a state tree composed of nodes and edges.

If a state tree with a hierarchy (depth) of N is completed, an optimal trajectory can be generated using this state tree and the algorithm can be terminated.

That is, it is possible to select the lowest nodes among the sum of the cost and the heuristic from among the expandable leaf nodes, complete a trajectory to the goal waypoint in the state tree, and determine the trajectory as the optimal path (see FIG. 9).

The algorithm illustrated in FIG. 10 is terminated when the state tree up to N is completed and trajectory planning is completed, and may be performed according to a local trajectory planning cycle of the mobile robot.

The algorithm illustrated in FIG. 10 is not a global trajectory planning method but a local trajectory planning method.

The local trajectory planning method may be performed at every time step, but any time step that has been previously subjected to the local trajectory planning may be skipped. That is, the local trajectory may not be performed at every time step.

That is, the time step for dividing the time during which the movement of the mobile robot is controlled and the local trajectory planning cycle may be different.

Since the position of the non-environmental obstacle that is likely to change over time can be detected and reflected only up to a range of the environment recognition sensor 310, the value of N should be determined in consideration of a detection range of the environment recognition sensor 310.

Considering the time point out of the detection range may be meaningless because the non-environmental obstacle cannot be detected.

In this case, the optimal path can be determined by determining the amount of computation of the computation processing means, selecting the nodes having the lowest sum of the cost and heuristic among the expandable leaf nodes, and completing the trajectory to the goal waypoint in the state tree.

If the depth of the state tree is not expanded to N time steps, the highest priority is given to the node having the smallest sum of the final cost value and the heuristic value for the leaf nodes of the state tree, and the node having the highest priority may be selected as a parent node of nodes to be generated in the future.

Initially, the root node has the highest priority.

After selecting the node having the highest priority as the parent node, a candidate node for determining a child node to be connected to the parent node is generated.

In this case, the nodes not selected as the parent node are stored according to their priorities, and when the calculation of the previously selected parent node is completed, the process of selecting the node having the next priority as the parent node may be repeated.

When the candidate node moves to a candidate of a predefined input value for a given time for extension to the next level in consideration of the robot state of the selected leaf node, the final state thereof is determined as a kinematically-feasible state.

It may be characterized in that, in the time step of the sampling based optimal tree planning method according to an embodiment of the present invention, a time interval is defined for each time step and the time interval for each time step is determined according to a predetermined rule In this case, it may be characterized in that the time interval increases as a sequence number of the time step increases.

This is to predict the future farther away while reducing the amount of calculation by calculating the time close to the present more closely and calculating the time more sparsely as the time closer to the present.

For example, the time interval from the first time step to the sixth time step can be sequentially set to T, T, 2T, 2T, 4T, and 4T and used.

In this case, six time steps are actually planned, but it is possible to predict the future up to 14T.

For a more detailed example, assuming that the root node is level 0, the next nodes are level 1, and the next nodes thereof are level 2, if the time from level 0 to level 1 is 5 ms, the time from level 1 to level 2 may be defined differently as 10 ms.

In the above description, although an example in which the time interval for each layer may be different from each other is described, the present invention is not limited thereto. It goes without saying that various implementations, such as implementation in which the time interval for each layer may be equal intervals, are possible.

In the above description, although the sampling based optimal tree planning method according to an embodiment of the present invention has been described, it goes without saying that the recording medium storing a program for executing the sampling based optimal tree planning method, and a program stored in the computer-readable recording medium for executing the sampling based optimal tree planning method can also be implemented.

That is, those skilled in the art can easily understand that the sampling based optimal tree planning method may be provided in a computer-readable recording medium by being included in a computer-readable recording medium by tangibly implementing a program of instructions for implementing the method. In other words, the method may be recorded on the computer-readable recording medium by being implemented in the form of program instructions that can be executed through various computer means. The computer-readable recording medium may contain program instructions, data files, data structures, etc., alone or in combination. The program instructions recorded in the computer-readable recording medium may be specially designed and configured for the present invention, or may be known and available to those skilled in the art of computer software. Examples of computer-readable recording media include magnetic media such as a hard disk, a floppy disk, and a magnetic tape, optical media such as a CD-ROM and a DVD, magneto-optical media such as a floptical disk, and hardware devices such as a ROM, a RAM, a flash memory, a USB memory, etc., that are specially configured for storing and executing program instructions are included. Examples of the program instructions may include a high-level language code that can be executed by a computer using an interpreter, etc., as well as a machine language code generated by a compiler. The hardware device may be configured to operate as one or more software modules to perform the operations of the present invention, and vice versa.

The present invention is not limited to the embodiments described above, and has a wide range of applications, and various modifications can be made thereto without departing from the gist of the present invention as claimed in the claims.

The invention claimed is:

1. A method for determining a path of a robot from a first location to a final location without collisions with obstacles using a sampling based optimal tree planning method implemented in a form of a program executed by a processor, the method comprising:

extracting, by the processor, a child node which is a state value according to an input value sampled according to a predetermined method, from a region consisting of a set of feasible state values in a parent node that is a state value that the robot needs to calculate at a specific time step, the time during which a movement of the robot is controlled being divided into time steps according to a certain standard; and calculating, by the processor, a cost for a state transition from the parent node to the child node, wherein extracting the child node and calculating the cost is repeatedly performed from the current time point of the robot to N (natural number) time steps, and an optimal path is generated based on the cost for the state transition from the parent node to the child node, the input value is extracted so that an interval between corresponding child nodes becomes narrower in a feasible acceleration region of the robot in linear acceleration and angular acceleration space, and linear acceleration or angular acceleration is closer to 0, wherein the feasible state values are states which do not deviate from kinematic limiting conditions.

2. The method according to claim 1, wherein in the extracting step, a node corresponding to a velocity value belonging to the feasible velocity range of the robot in the linear velocity and angular velocity space is extracted, a node corresponding to an acceleration value belonging to the feasible acceleration range of the robot in the linear acceleration and angular acceleration space is extracted, the velocity region and the acceleration region are unified into one space selected from the linear velocity and angular velocity space or the linear acceleration and angular acceleration space, and a node corresponding to a state value belonging to a region where the velocity region and the acceleration region overlapped is extracted as the child node.

3. The method according to claim 2, wherein in the extracting step, a node corresponding to an intersection point value of a boundary of the velocity region and a boundary of the acceleration region in the unified space is additionally extracted as the child node.

4. The method according to claim 1, wherein in the extracting step, the feasible velocity region of the robot in the linear velocity and angular velocity space or the feasible acceleration region of the robot in the linear acceleration and angular acceleration space are unified into one space selected from the linear velocity and angular velocity space or the linear acceleration and angular acceleration space, and a node corresponding to a state value belonging to an actually feasible region of the robot, which is a region where the velocity region and the acceleration region are overlapped.

5. The method according to claim 1, wherein in the calculating step, a cost for state transition is calculated only for child nodes that do not collide with an obstacle among the child nodes extracted in the extracting step.

6. The method according to claim 1, wherein in the sampling based optimal tree planning method, a path to a child node, which corresponds to a last time step and whose sum of a cost for the state transition from the current point of the robot to the child node which corresponds to the last time step and heuristics the state transition from the child node which corresponds to the last time step to a goal point is the minimum, is determined as an optimal path.

7. The method according to claim 1, wherein in the time step, a time interval is defined for each time step, and the time interval for each time step is determined according to a predetermined rule.

8. A non-transitory computer-readable medium storing a program for executing the method for determining a path of a robot from a first location to a final location without collisions with obstacles using a sampling based optimal tree planning method according to claim 1.

9. A program stored in a non-transitory computer-readable medium for executing the method for determining a path of a robot from a first location to a final location without collisions with obstacles using a sampling based optimal tree planning method according to claim 1.

* * * * *